United States Patent
Zhang et al.

(10) Patent No.: US 9,923,762 B1
(45) Date of Patent: Mar. 20, 2018

(54) UPGRADING AN ENGINE WHEN A SCENARIO IS RUNNING

(71) Applicant: CA, Inc., Islandia, NY (US)

(72) Inventors: Haiyang Zhang, Beijing (CN); Xiaopin Wang, Beijing (CN); Ran Shuai, Beijing (CN); Pengfei Yu, Beijing (CN)

(73) Assignee: CA, INC., Islandia, NY (US)

( * ) Notice: Subject to any disclaimer, the term of this patent is extended or adjusted under 35 U.S.C. 154(b) by 479 days.

(21) Appl. No.: 13/965,607

(22) Filed: Aug. 13, 2013

(51) Int. Cl.
*G06F 15/177* (2006.01)
*H04L 12/24* (2006.01)

(52) U.S. Cl.
CPC .................................. *H04L 41/08* (2013.01)

(58) Field of Classification Search
CPC . H04L 41/08; H04L 41/082; G06F 2205/123; G06F 2211/1071; G06F 11/2082; G06F 11/3632; G06F 17/30174; G06F 17/30575; G06F 3/1225; G06F 3/123; G06F 8/67
USPC ....... 709/203, 208, 212, 213, 219, 226, 246, 709/248; 715/203
See application file for complete search history.

(56) References Cited

U.S. PATENT DOCUMENTS

| | | | | |
|---|---|---|---|---|
| 5,455,926 A * | 10/1995 | Keele et al. ...................... 711/4 |
| 5,497,494 A * | 3/1996 | Combs et al. ................. 713/323 |
| 5,504,861 A * | 4/1996 | Crockett ............. G06F 11/1435 714/13 |
| 5,511,202 A * | 4/1996 | Combs et al. ................. 713/323 |
| 5,513,359 A * | 4/1996 | Clark et al. .................... 713/323 |
| 5,692,155 A * | 11/1997 | Iskiyan ............... G06F 11/2082 711/162 |
| 5,734,818 A * | 3/1998 | Kern et al. ....................... 714/20 |
| 5,758,118 A * | 5/1998 | Choy .................. G06F 11/1092 711/114 |
| 6,356,977 B2* | 3/2002 | Ofek et al. ..................... 711/112 |
| 6,694,413 B1* | 2/2004 | Mimatsu ............ G06F 11/1466 707/999.202 |
| 6,732,124 B1* | 5/2004 | Koseki ................ G06F 11/1435 |
| 6,738,877 B1* | 5/2004 | Yamakawa ............. G06F 21/31 711/163 |
| 7,200,726 B1* | 4/2007 | Gole et al. ..................... 711/162 |
| 7,394,710 B1* | 7/2008 | Gallagher ..................... 365/221 |
| 7,836,267 B1* | 11/2010 | Cross .................. G06F 11/1435 707/609 |

(Continued)

OTHER PUBLICATIONS

"Online Help CA ARCserve Replication and High Availability r16.5", CA Technologies https://support.ca.com/cadocs/0/CA%20ARCserve%20Replication%20and%20High%20Availability%20r16%205-ENU/Bookshelf_Files/HTML/OLH/index.htm; accessed Jun. 15, 2013, Copyright 2013.

*Primary Examiner* — Michael Y Won
(74) *Attorney, Agent, or Firm* — Sage Patent Group (57) ABSTRACT

A method includes receiving a request for modification of computer readable program code associated with a scenario being executed at a production server. The production server is configured to provide a computing service. Writing to a storage medium associated with the production server with respect to data specified by the protection scenario is suspended during the modification responsive to the request, such that synchronization of the data specified by the scenario is maintained between the production server and a standby server during the modification. Related systems and computer program products are also discussed.

26 Claims, 6 Drawing Sheets

(56) References Cited

U.S. PATENT DOCUMENTS

| | | | |
|---|---|---|---|
| 7,904,746 B2* | 3/2011 | Nakamura | G06F 11/1469 714/3 |
| 8,316,199 B2* | 11/2012 | Kirihata | G06F 21/6281 711/163 |
| 2001/0011318 A1* | 8/2001 | Dalvi | G06F 12/1433 711/103 |
| 2001/0044834 A1* | 11/2001 | Bradshaw | G06F 17/3089 709/217 |
| 2002/0073082 A1* | 6/2002 | Duvillier | G06F 17/30348 |
| 2002/0184255 A1* | 12/2002 | Edd | G06F 17/3089 715/205 |
| 2002/0198899 A1* | 12/2002 | Yamaguchi | G06F 17/30575 |
| 2003/0208511 A1* | 11/2003 | Earl et al. | 707/204 |
| 2004/0078633 A1* | 4/2004 | Holland | 714/5 |
| 2004/0215666 A1* | 10/2004 | Hrle | G06F 11/1471 |
| 2004/0267752 A1* | 12/2004 | Wong et al. | 707/9 |
| 2005/0033828 A1* | 2/2005 | Watanabe | G06F 11/2074 709/219 |
| 2005/0132179 A1* | 6/2005 | Glaum | G06F 11/1433 713/1 |
| 2005/0289197 A1* | 12/2005 | Kan | G06F 11/2097 |
| 2006/0036616 A1* | 2/2006 | Bastawala | G06F 17/30457 |
| 2006/0036655 A1* | 2/2006 | Lastovica, Jr. | G06F 17/30315 |
| 2006/0085413 A1* | 4/2006 | Ogawa | G06F 17/30315 |
| 2006/0085608 A1* | 4/2006 | Saika | G06F 3/0605 711/162 |
| 2006/0112244 A1* | 5/2006 | Buah | G06F 11/2071 711/162 |
| 2006/0277328 A1* | 12/2006 | Cherian | G06F 3/0607 710/36 |
| 2007/0100828 A1* | 5/2007 | Holt | G06F 9/526 |
| 2008/0040712 A1* | 2/2008 | Tanaka | 717/168 |
| 2008/0130652 A1* | 6/2008 | Holt | 370/394 |
| 2008/0133884 A1* | 6/2008 | Holt | 712/32 |
| 2008/0134163 A1* | 6/2008 | Golde | G06F 9/4426 717/168 |
| 2008/0244134 A1* | 10/2008 | Hosomi | G06F 12/0808 710/200 |
| 2008/0294700 A1* | 11/2008 | Sugimoto | 707/200 |
| 2009/0043972 A1* | 2/2009 | Kamiko et al. | 711/154 |
| 2009/0144440 A1* | 6/2009 | Subbanna | G06F 17/30171 709/233 |
| 2009/0164994 A1* | 6/2009 | Vasilevsky | G06F 9/45533 718/1 |
| 2009/0241100 A1* | 9/2009 | Sakurai | G06F 11/1433 717/170 |
| 2011/0055182 A1* | 3/2011 | Buban | G06F 17/3007 707/704 |
| 2011/0208905 A1* | 8/2011 | Shaeffer | G11C 16/10 711/103 |
| 2012/0191758 A1* | 7/2012 | Lewis | G06F 21/6218 707/784 |
| 2013/0066930 A1* | 3/2013 | Kamei | G06F 3/061 707/823 |
| 2014/0025770 A1* | 1/2014 | Warfield | G06F 15/17331 709/213 |
| 2015/0244795 A1* | 8/2015 | Cantwell et al. | 709/202 |

* cited by examiner

UPGRADING AN ENGINE WHEN A SCENARIO IS RUNNING

BACKGROUND

The present disclosure relates to computing systems, and more specifically, to data redundancy in computing systems.

Computer systems may include files and/or other content that requires protection from various events. Some of these events may include power loss, system failure, and/or complete loss (for example, due to natural disaster). Various systems have been developed to provide replication services for such file content. Such systems may be referred to as Replication and High Availability (RHA) systems.

Replication involves sharing information between redundant resources, such as software or hardware components, so as to ensure consistency and to improve reliability, fault-tolerance, and/or accessibility. Replication can be extended across a computer network, so that resources can be local or physically remote. As such, replicas of file systems may be backed up to other locations and retrieved at a later time to accurately restore a file system. However, latency can place limitations as to the physical distance between sites and/or the type of replication that can be employed.

Some replication systems can be disruptive to services and/or applications provided by computer systems. For example, upgrading a software system may trigger a synchronization operation where the data to be protected is transferred from one or more master servers to one or more replica servers, which may require a significant amount of downtime. Also, journal files on the replica server(s) that have not been previously applied may be lost and/or may also require re-synchronization, which may involve even more downtime.

BRIEF SUMMARY

Systems, methods, and computer program products for modifying a system when a scenario is running are described herein.

According to some embodiments, a method includes receiving a request for modification of computer readable program code associated with a scenario being executed at a production server. The production server is configured to provide a computing service. Writing to a storage medium associated with the production server with respect to data specified by the protection scenario is suspended during the modification responsive to the request, such that synchronization of the data specified by the scenario is maintained between the production server and a standby server during the modification. The operations of the methods described herein may be performed by at least one processor.

In some embodiments, an indication of completion of the modification may be received, and changes for the data specified by the scenario may be captured. Replication of the data specified by the scenario may be performed by transferring the changes to the standby server responsive to receiving the indication and independent of a synchronization operation for the data specified by the scenario after completion of the modification.

In some embodiments, in capturing the changes, input/output (I/O) requests for the data specified by the scenario received during the modification may be tracked. The I/O requests may be executed responsive to receiving the indication of completion of the modification.

In some embodiments, in suspending the writing, an instruction to halt write operations to a storage area of the storage medium that includes the data specified by the scenario may be provided responsive to the request for modification, and an instruction to resume the write operations to the storage area may be provided responsive to the indication of completion. The I/O requests may be received between providing the instruction to halt and providing the instruction to resume the write operations. A duration of time between providing the instruction to halt and providing the instruction to resume the write operations may be about one to two seconds.

In some embodiments, the computer readable program code may be an engine module associated with the scenario. A status of the engine module and/or a status of the data specified by the scenario may be saved responsive to providing the instruction to halt the write operations to the storage area, and a notification to proceed with the modification may be transmitted to an upgrade program or module responsive to saving the status. The status of the data specified by the scenario and/or the status of the engine module may be restored responsive to receiving the indication of completion of the modification.

In some embodiments, prior to restoring the status, the engine module may be started, and a notification to proceed with modification of a driver module associated with the scenario may be transmitted to the upgrade program or module responsive to starting the engine.

In some embodiments, the data specified by the scenario may correspond to protection of a file system stored on the production server, and the I/O requests may correspond to file input/output events that are intended for the file system.

In some embodiments, the modification of the computer readable program code associated with the scenario may be performed without interruption of execution of the scenario and/or the computing service by the production server. For example, writing to the storage medium with respect to data that is not specified by the scenario may be permitted during the modification. The writing may be initiated by or otherwise be associated with performance of the computing service by the production server.

In some embodiments, a notification to suspend replication of the data specified by the scenario may be transmitted to the standby server responsive to receiving the request. Prior to transferring the changes, a notification to resume the replication of the data specified by the scenario may be transmitted the replica server responsive to receiving the indication and independent of a synchronization operation for the data specified by the scenario after completion of the modification.

According to further embodiments, a computer system includes a processor and a memory coupled to the processor. The memory includes computer readable program code embodied therein that, when executed by the processor, causes the processor to receive a request for modification of computer readable program code associated with a scenario being executed at a production server that is configured to provide a computing service, and suspend writing to a storage medium associated with the production server with respect to data specified by the scenario during the modification responsive to the request. As such, synchronization of the data specified by the scenario is maintained between the production server and a standby server during the modification.

According to still further embodiments, a computer program product includes a computer readable storage medium having computer readable program code embodied in the medium. The computer readable program code includes computer readable program code configured to recognize a request for modification of computer readable program code associated with a scenario being executed at a production server that is configured to provide a computing service, and computer readable program code configured to suspend writing to a storage medium associated with the production server with respect to data specified by the scenario during the modification responsive to the request. Synchronization of the data specified by the scenario is thereby maintained between the production server and a standby server during the modification.

It is noted that aspects described with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. As used herein, a processor may refer to one processor or multiple processors.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As described herein, a computing system or environment may include one or more hosts, operating systems, peripherals, and/or applications. Machines in a same computing system or environment may have shared memory or resources, may be associated with the same or different hardware platforms, and/or may be located in the same (e.g., local) or different (e.g., remote) physical locations. Computing environments described herein may refer to a virtualized environment (such as a cloud environment) and/or a physical environment. Machines described herein may refer to physical machines or virtual machines (VMs), which may be managed by one or more virtual hypervisors in some embodiments.

As further described herein, a production server, machine, system, or environment is one that is configured to actively perform operations or tasks associated with providing one or more computing services (including processing and/or storage services) for end users. In contrast, a standby server, machine, system, or environment may provide backup or redundancy of the data stored on the production server, and thus performs operations or tasks distinct from those associated with the service(s) provided by the production server. In other words, the standby server may be considered a "non-production" machine. The standby server(s) and the production server(s) may be located in a same or different physical location, computing environment, or datacenter, and/or may or may not share memory or other resources.

Computing services described herein can also include web services, which are software systems designed to support interoperable machine-to-machine interaction over a network. Other systems may interact with the web service in a manner prescribed by its description using messages, such as Simple Object Access Protocol (SOAP) messages, typically conveyed using Hypertext Transport Protocol (HTTP) with an Extensible Markup Language (XML) serialization in conjunction with other Web-related standards. As such, web services can provide a standard for interoperating between different software applications running on a variety of platforms and/or frameworks.

A scenario may describe interactions with a computing system in the performance of an activity or service. In some embodiments described herein, a protection scenario may refer to a protection or replication configuration, which specifies or defines protection information, including identification of the data to be protected (for example by application type, specific folders etc.), as well as information about the master and replica servers to be used in the replication of the data. In this context, a protection scenario being executed (or 'running') means that the production (e.g., master) server is being protected according to the configuration defined by the scenario, and that changes are being captured/recorded and sent to the standby (e.g., replica) server. For example to protect c:\folder1 of server A with replication on c:\folder2 of server B, the protection scenario may specify the IP addresses of server A and server B, the locations/storage areas of c:\folder1 and c:\folder2 on the respective storage media associated with servers A and B, and/or any other information identifying, associated with, or otherwise relevant to protection of c:\folder1 and c:\folder2. An engine service or module may refer to the computer readable program code that is configured to provide an interface for communicating requests and responses associated with the scenario, while a driver or driver module may refer to computer readable program code that is configured to translate inputs/outputs into processing instructions for the underlying server hardware.

Some embodiments of the disclosure described herein arise from realization that, during an upgrade (or other modification), a protection service or system (such as replication and/or high-availability software) that protects a master server is typically stopped. While the protection service is temporarily stopped, data/files that would normally be protected by the service may be changed or altered. Since these changes are not sent to the replica server (as the replication has been stopped), a synchronization process may be required after the upgrade is completed to ensure that the data on the master server and the replica server are identical. Thus, when a protection scenario is running, upgrading, updating, or otherwise modifying the engine service may trigger a re-synchronization operation (also referred to as a re-sync), which may require a significant amount of time to compare and transfer data between the master and replica servers. Also, journal files on the replica server that have not yet been applied may be lost during this process.

Accordingly, embodiments of the present disclosure as described herein provide methods, systems, and computer program products that can avoid such a resynchronization operation when upgrading or otherwise modifying a protection service or system for a production server, by maintaining synchronization of the data designated for protection on the production server (also referred to herein as protected data) during the modification. In particular, when an upgrade or other modification is performed, an upgrade driver as described herein may 'freeze' a data storage medium associated with the production server (at least with respect to the data designated for protection by a running protection scenario), and may capture changes or input/output requests for the protected data that occur during the upgrading period. As used herein, 'freezing' indicates that an application or other computing service provided by the production server is prevented from writing to the protected data during the modification period, thereby eliminating the possibility of changes to the data and preventing a loss of synchronization with the replicated data stored on the standby server. After completing the upgrading, the engine service will continue to run and continue to protect the production server without stopping the scenario and without performing a re-synchronization operation, because the changes prior to the modification have already been synchronized with the standby server, and no changes to the protected data can be made during the modification. Also, the production server can continuously provide a computing service (for example, an Exchange server can continuously provide e-mail service) to end-users without interruption during the modification period.

Figure 1:
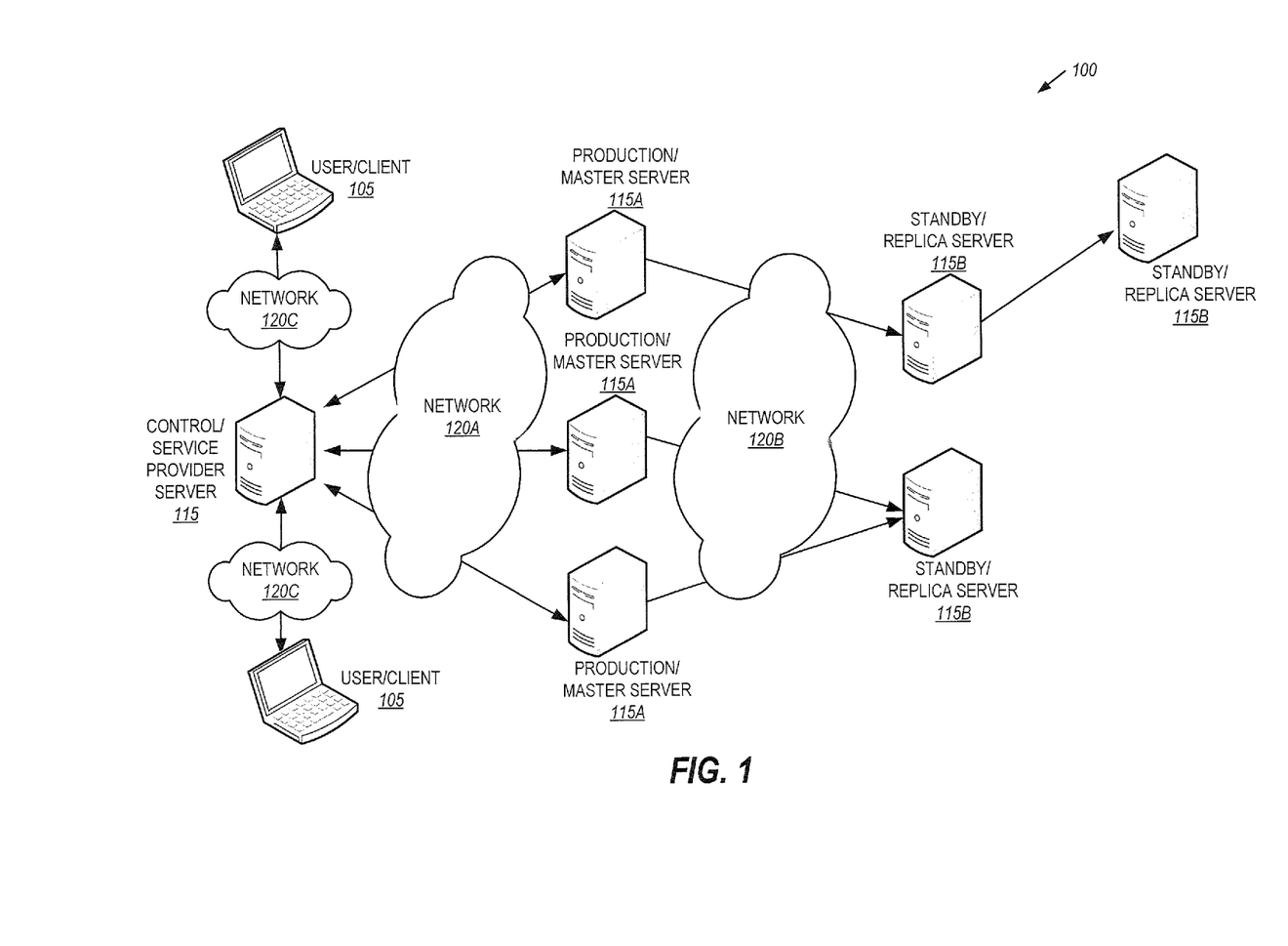
FIG. 1 is a block diagram of a computing system or environment for updating, upgrading, or otherwise modifying a protection system when a protection scenario is running in accordance with some embodiments of the present disclosure.

FIG. 1 illustrates a computing system or environment 100 for updating, upgrading, or otherwise modifying a protection system when a protection scenario is running in accordance with some embodiments of the present disclosure. Referring now to FIG. 1, the computing system 100 includes one or more user or client devices 105 that are coupled to one or more server devices (illustrated as a computing service provider 115) via one or more networks 120C. The client device(s) 105 and server(s) 115 can communicate via the network 120C using a standard communications mode or application programming interface (API), such as Hypertext Transport Protocol (HTTP), SOAP, XML-RPC, and/or WSDL. In general, the client/server environment maintains a distinction between client and server processes, although client and server processes may operate on different machines or on the same machine.

It will be appreciated that in accordance with various embodiments of the present disclosure, the service provider 115 may be implemented as a single server, separate servers, or a network of servers either co-located in a server farm, for example, or located in different geographic regions. In particular, as shown in the example of FIG. 1, the server 115 controls is coupled via network 120A to one or more production servers (also referred to herein as master or active servers) 115A, where the servers 115, 115A are collectively configured to provide the computing service for the users/clients 105. For example, the servers 115, 115A may be Exchange, Structured Query Language (SQL), and/or Oracle servers. The production servers 115A are also coupled via network 120B to standby servers (also referred to herein as replica or backup servers) 115B that are collectively configured to synchronize and replicate the data stored on the production servers 115A and/or server 115.

As used herein, synchronization refers to a process by which data that has been designated or specified for protection on the master/production server(s) 115, 115A is transferred to the replica/standby server(s) 115B, to ensure that the protected data on the master/production server(s) 115, 115A is identical to the data stored on the replica/standby server(s) 115B. The data designated for protection may be limited to one or more files, folders, systems, and/or databases stored on one or more of the servers 115, 115A (or on associated local or remote storage media), or may include the entirety of the data stored on one or more of the servers 115, 115A. A protection scenario as described herein may designate or specify such particular data for protection. Also, as used herein, replication refers to a process by which changes with respect to the protected files, folders, systems, and/or databases on the master/production server(s) 115, 115A are transferred to the replica/standby server(s) 115B. Replication is typically performed after synchronizing the data stored on the replica/standby server(s) 115B with the data on the master/production server(s) 115, 115A. For example, an initial synchronization may be performed when a protection program or system as described herein is installed on the servers 115, 115A, 115B, followed by scheduled and/or periodic replication. As such, when one or more of the production servers 115, 115A is down or otherwise unavailable, the data stored thereon can be recovered from the identical data stored on one or more of the standby servers 115B.

The networks 120A, 120B, 120C may be a global network, such as the Internet or other publicly accessible network. Various elements of the networks 120A, 120B, 120C may be interconnected by a wide area network (WAN), a local area network (LAN), an Intranet, and/or other private network, which may not be accessible by the general public. Thus, the communication networks 120A, 120B, 120C may represent a combination of public and private networks or a virtual private network (VPN). The networks 120A, 120B, 120C may be a wireless network, a wireline network, or may be a combination of both wireless and wireline networks. Although illustrated as separate networks, it will be understood that the networks 120A, 120B, 120C may represent a same or common network in some embodiments. As such, one or more of the servers 115, 115A, and/or 115B may be co-located or remotely located, and communicatively coupled by one or more of the networks 120A, 120B, and/or 120C.

Still referring to FIG. 1, in accordance with some embodiments of the present disclosure, a protection system is installed on the master/production servers 115, 115A and the replica/standby servers 115B. The protection system includes driver and engine modules. The driver module is configured to capture changes to files, folders, file systems, databases, and/or other data stored on the servers 115, 115A that is designated or otherwise specified for protection, for example, by a currently executing scenario. The driver module may include an upgrade driver and a kernel driver (also referred to herein as a main driver) in some embodiments. The engine module is configured to transfer the data designated for protection (and/or changes thereto) from the master/production servers 115, 115A to the replica/standby servers 115B via the network 120B. The engine module may include a user mode program in some embodiments. The protection system also includes an upgrade module installed on the master/production servers 115, 115A and the replica/standby servers 115B. The upgrade module is configured to coordinate modifications (including updates and/or upgrades) to the driver and/or engine modules of the protection system such that synchronization of protected data is maintained between the production servers 115, 115A and the standby servers 115B during the modification, thereby avoiding the need for a synchronization operation after the modifications, as described in greater detail below.

Although FIG. 1 illustrates an example computing environment, it will be understood that embodiments of the present disclosure are not limited to such a configuration, but are intended to encompass any configuration capable of carrying out the operations described herein. For example, while illustrated with reference to physical machines, it will be understood that one or more of the servers 115, 115A, 115B may be implemented as virtual machines in some embodiments.

Figure 2:
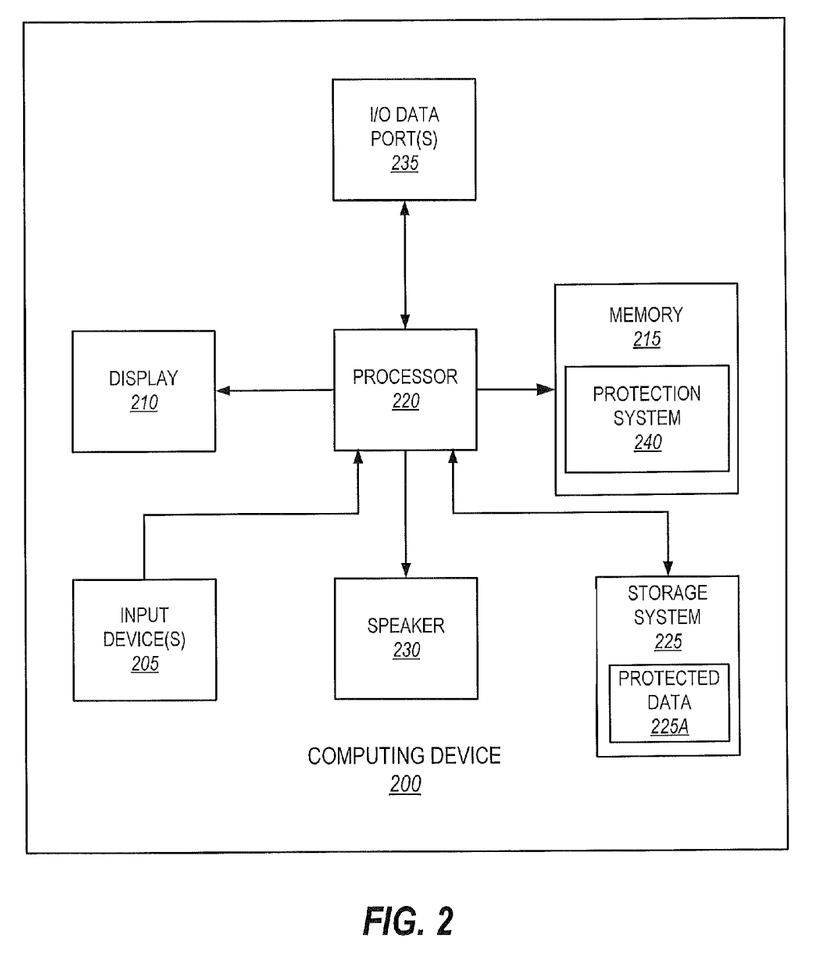
FIG. 2 is a block diagram that illustrates a computing device for updating, upgrading, or otherwise modifying a protection system when a protection scenario is running in accordance with some embodiments of the present disclosure

FIG. 2 illustrates an example computing device 200 including a protection system 240 that can be upgraded, updated, or otherwise modified when a protection scenario is running in accordance with some embodiments of the present disclosure. The device 200 may be used, for example, to implement one or more of the production servers 115, 115A and/or one or more of the standby servers 115B in the system 100 of FIG. 1 using hardware, software implemented with hardware, firmware, tangible computer-readable storage media having instructions stored thereon, or a combination thereof, and may be implemented in one or more computer systems or other processing systems. The computing device 200 may also be a virtualized instance of a computer. As such, the devices and methods described herein may be embodied in any combination of hardware and software.

As shown in FIG. 2, the computing device 200 may include input device(s) 205, such as a keyboard or keypad, a display 210, and a memory 215 that communicate with one or more processors 220 (generally referred to herein as "a processor"). The computing device 200 may further include a storage system 225, a speaker 230, and I/O data port(s) 235 that also communicate with the processor 220. The memory 215 may include a protection system module 240 installed thereon. The protection system 240 may be configured to allow for updates, upgrades, and/or other modifications to the system 240 (i.e., to itself) without stopping a currently executing protection scenario and without performing (i.e., independent of) a data synchronization operation following the modification, as described in greater detail herein.

The storage system 225 may include removable and/or fixed non-volatile memory devices (such as but not limited to a hard disk drive, flash memory, and/or like devices that may store computer program instructions and data on computer-readable media), volatile memory devices (such as but not limited to random access memory), as well as virtual storage (such as but not limited to a RAM disk). The storage system 225 may store data 225A (including but not limited to files, folders, file systems, and/or databases) that is specified for protection, for example, by a protection scenario running on the device 200. Although illustrated in separate blocks, the memory 215 and the storage system 225 may be implemented by a same storage medium in some embodiments. The input/output (I/O) data port(s) 235 may include a communication interface and may be used to transfer information in the form of signals between the computing device 200 and another computer system or a network (e.g., the Internet). The communication interface may include a modem, a network interface (such as an Ethernet card), a communications port, a PCMCIA slot and card, or the like. These components may be conventional components, such as those used in many conventional computing devices, and their functionality, with respect to conventional operations, is generally known to those skilled in the art. Communication infrastructure between the components of FIG. 2 may include one or more device interconnection buses such as Ethernet, Peripheral Component Interconnect (PCI), and the like.

Figure 3A:
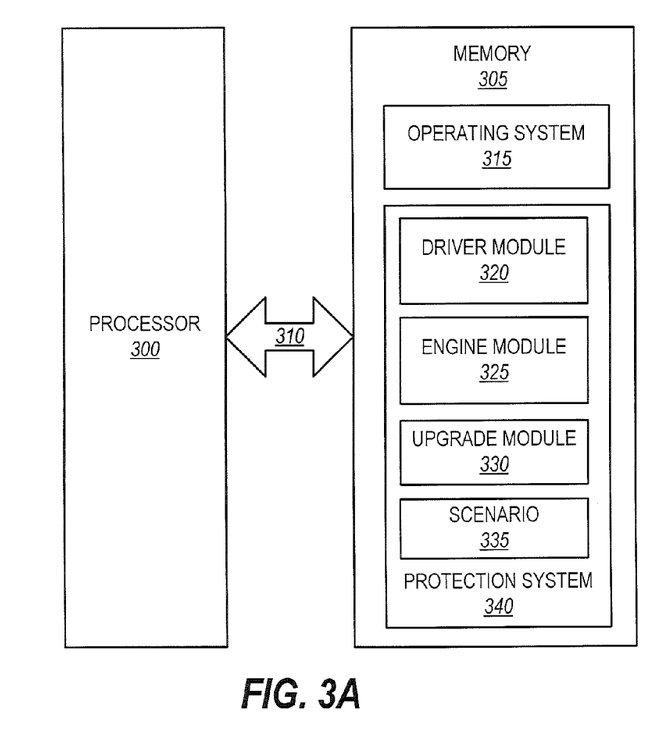
FIGS. 3A and 3B are block diagrams illustrating a software/hardware architecture for updating, upgrading, or otherwise modifying a protection system when a protection scenario is running in accordance with some embodiments of the present disclosure.

FIG. 3A illustrates a processor 300 and memory 305 that may be used in computing devices or other data processing systems, such as the computing device 200 of FIG. 2 and/or the servers 115, 115A, 115B of FIG. 1, for updating, upgrading, or otherwise modifying a protection system when a protection scenario is running in accordance with some embodiments of the present disclosure. The processor 300 communicates with the memory 305 via an address/data bus 310. The processor 300 maybe, for example, a commercially available or custom microprocessor, including, but not limited to, digital signal processor (DSP), field programmable gate array (FPGA), application specific integrated circuit (ASIC), and multi-core processors. The memory 305 may be a local storage medium representative of the one or more memory devices containing software and data in accordance with some embodiments of the present invention. The memory 305 may include, but is not limited to, the following types of devices: cache, ROM, PROM, EPROM, EEPROM, flash, SRAM, and DRAM.

As shown in FIG. 3A, the memory 305 may contain multiple categories of software and/or data installed therein, including (but not limited to) an operating system 315 and a protection system 340. The operating system 315 generally controls the operation of the computing device or data processing system. In particular, the operating system 315 may manage software and/or hardware resources and may coordinate execution of programs by the processor 300, for example, in providing a computing service for an end-user, such as the user(s)/client(s) 105 of FIG. 1.

The protection system 340 includes a driver module 320, an engine module 325, and an upgrade module 330. In some embodiments of the present disclosure, the driver module 320 is configured to capture changes to the files, folders, file systems, databases and/or other data that is designated for protection on the production server(s) (115, 115A in FIG. 1). For example, particular data may be specified for protection by a protection scenario 335 that is currently running on one or more of the servers 115, 115A, 115B. The protection scenario 335 may define a protection or replication configuration identifying master server and replica server information (for example, IP addresses, source and target volumes, etc.) as well as identifying the specific data to be protected on the master server (for example, by application type and/or location of the specific folders, files, file systems, and/or databases). The engine module 325 is a user mode program or application that is configured to transfer changes to the data designated for protection by the scenario 335 from the production servers to the standby server(s) (115B in FIG. 1). The upgrade module 330 is configured to coordinate modifications (for example, updates and/or upgrades) to the driver module 320 and/or engine module 325 without subsequent synchronization of the data (i.e., files, folders, file systems, and/or databases) that is designated for protection by the scenario 335 after completion of the modification(s).

Figure 3B:
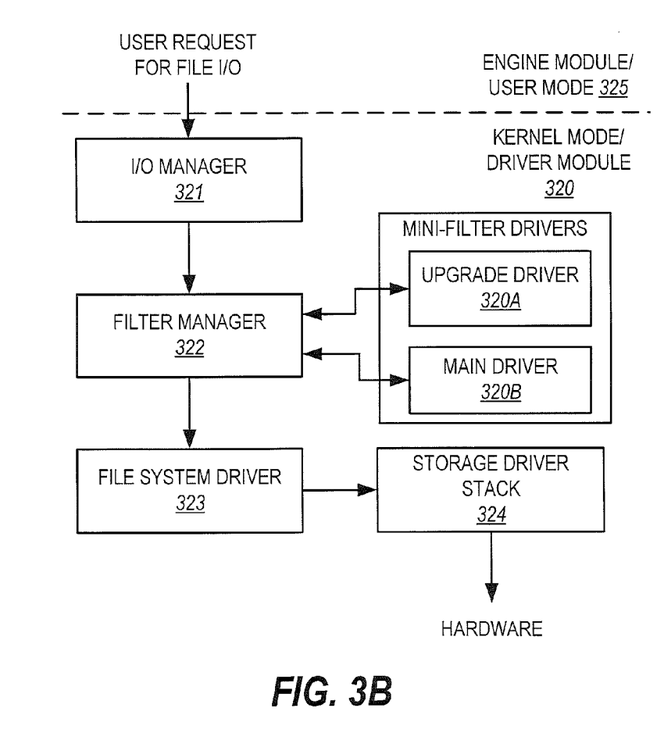

As shown in FIG. 3B, the driver module 320 includes two mini-filter drivers, an upgrade driver 320A and a main or kernel driver 320B. The engine module 330 receives a user request for file I/O with respect to the protected data, and forwards the request to the driver module 320. The driver module 320 further includes an I/O manager 321 that receives and forwards the request to the file system. A filter manager 322 intercepts the request and calls the registered mini-filters 320A, 320B in altitude order, which identifies where each of the mini-filters is loaded relative to other mini-filters in the I/O stack. In FIG. 3B, the upgrade driver 320A may be assigned a higher altitude or order than the main driver 320B. As such, as described in greater detail below, I/O requests or file operations (for example, file open, write, delete, etc.) with regard to or intended for protected data specified by the scenario 335 may be captured by the upgrade driver 320A when the engine module 325 is being upgraded, updated, or otherwise modified. The requests are modified by the upgrade driver 320A and/or the main driver 320B, and the file system driver 323 processes and forwards the modified requests to the storage driver stack 324 for the target volume, for instance, on a standby server. The storage driver stack 324 prepares and forwards the modified request as one or more instructions to the underlying hardware.

In embodiments of the present disclosure, during the upgrade, update, or other modification processes described herein, the driver module 320 is configured to send an instruction to the processor 300 to temporarily suspend writing to a storage medium associated with the production server (such as the storage system 225 of FIG. 2), at least with respect to the data specified by the scenario 335. Such a temporary suspension of writing operations to the storage medium is also referred to herein as 'freezing' the storage medium. For example, the upgrade driver 320A may be configured to provide an instruction to halt write operations to the storage medium with respect to the particular files, folders, file systems, and/or databases specified by the scenario 335 in response to receiving a request to modify (e.g., update and/or upgrade) the protection system 340. Accordingly, when 'frozen,' an application or other computing service provided by the production server will not write to storage locations including the data specified for protection, thereby preventing changes to the data during the period in which the protection system 340 is being upgraded, updated, and/or otherwise modified. However, writing to the storage medium may be permitted for data that is not protected (or not otherwise specified) by the scenario 335 during modification of the protection system 340, such that the modification can be performed without interruption of the computing service provided by the production server.

The driver module 320 (in particular, the main driver 320B) may also be configured to capture or track input/output (I/O) requests intended for the data specified by the scenario 335 that are received during the modification period. After the modification to the protection system 340 is completed, the driver module 320 may send an instruction to resume or allow write operations to the storage medium (also referred to herein as "unfreezing" the storage medium) with respect to the data specified by the scenario, the processor 300 may execute the saved I/O requests, and the engine 330 may be re-started and may continue to protect the production server(s) (115, 115A of FIG. 1). The duration during which the storage medium is frozen (i.e., the elapsed time between providing the instruction to halt write operations and providing the instruction to resume the write operations) may be about 1 to 2 seconds in some embodiments. Accordingly, as writing to the memory 305 or other storage medium is temporarily stopped, no changes may be made to the protected data during the modification period, and thus, synchronization of the protected data is not required after the modification.

Although FIGS. 3A-3B illustrate exemplary hardware/software architectures that may be used in data processing systems, such as the computing device 200 of FIG. 2, it will be understood that the present invention is not limited to such a configuration but is intended to encompass any configuration capable of carrying out operations described herein. Moreover, the functionality of the computing device 200 of FIG. 2 and the hardware/software architecture of FIGS. 3A-3B may be implemented as a single processor system, a multi-processor system, a processing system with one or more cores, a distributed processing system, or even a network of stand-alone computer systems, in accordance with various embodiments.

Computer program code for carrying out the operations discussed above with respect to FIG. 3 may be written in a high-level programming language, such as COBOL, Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Figure 4:
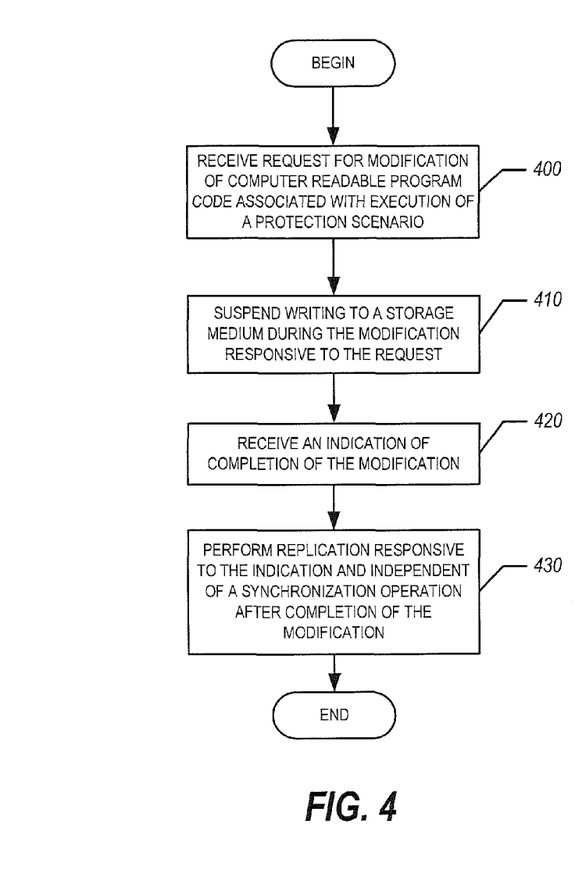
FIGS. 4-7 are flow diagrams that illustrate operations for updating, upgrading, or otherwise modifying a protection system when a protection scenario is running in accordance with some embodiments of the present disclosure.

Operations for updating, upgrading, or otherwise modifying a protection system when a protection scenario is running in accordance with some embodiments of the present disclosure will now be described with reference to the flowcharts of FIGS. 4 to 7. FIG. 4 illustrates operations that may be performed by a production server (such as one or more of the servers 115, 115A of FIG. 1) to maintain synchronization of data specified by a protection scenario executing thereon during an upgrade, update, or other modification of the protection software installed on the production server.

Referring now to FIG. 4, operations begin at block 400 where a request for modification (for example, a request for an update and/or upgrade) of computer readable program code associated with the protection scenario is received. The protection scenario may specify a protection configuration indicating the location and/or identifying information for data to be protected on the production/master server, as well as the location and/or and identifying information for a standby/replica server. In response to the request, writing to a storage medium associated with the production server is suspended with respect to the data specified by the protection scenario at block 410. The storage medium may be local to the production server or may be remote from the production server and coupled thereto via a network. At block 420, an indication of completion of the modification of the computer readable program code is received. In response to the indication, replication of the data specified by the protection scenario is performed at block 430. For example, the replication may have been suspended during the modification, and may be resumed in response to the indication that the modification has been completed. In particular, in resuming the replication, any changes captured with respect to the protected data (for example, based on I/O requests that were received during the modification) may be executed and transferred to the standby/replica server after the completion of the modification. Because writing to the storage medium was suspended (at block 410) during the modification, synchronization of the data specified by the scenario is maintained between the production/master server and the standby/replica server. Thus, the replication is performed (at block 430) without the need for (i.e., independent of) a synchronization operation for the data specified by the protection scenario after the modification is completed.

Figure 5:
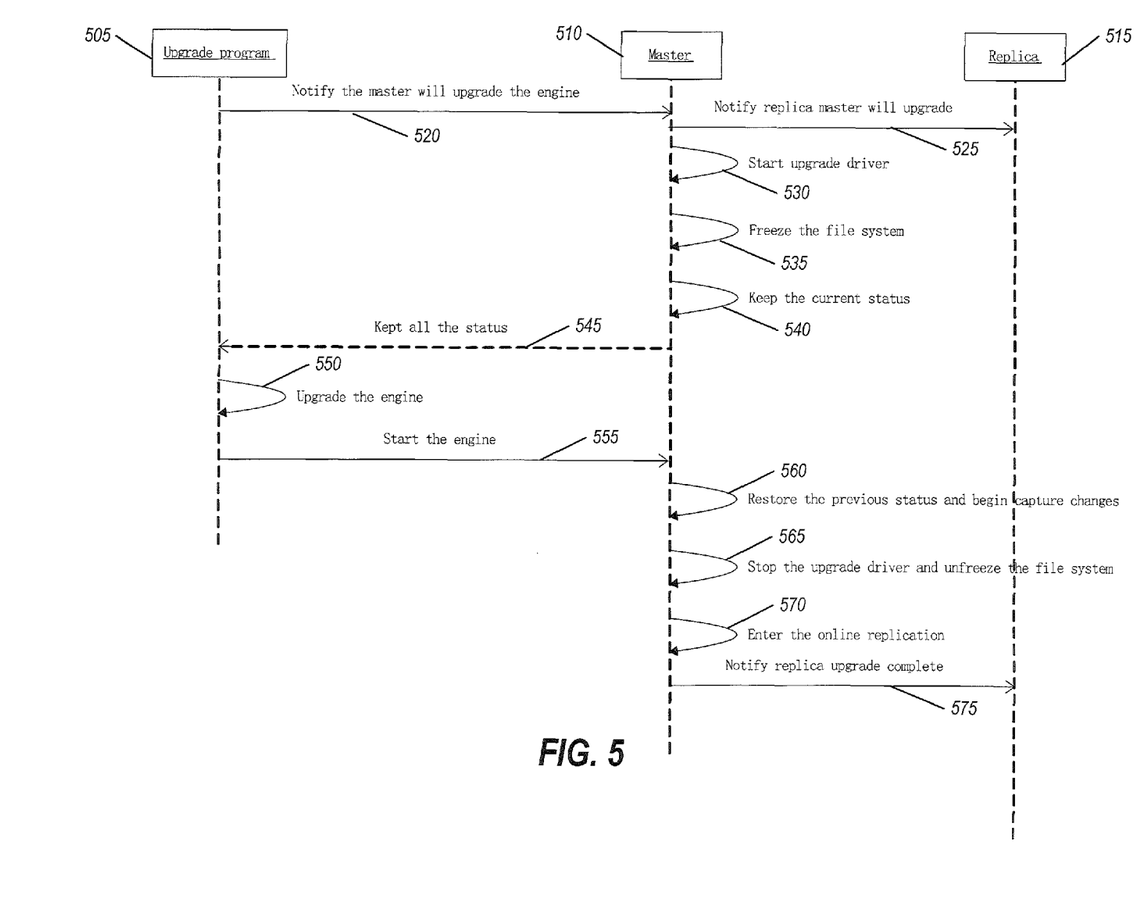

FIG. 5 is a flow diagram illustrating operations for upgrading an engine at the master server according to some embodiments of the present disclosure in greater detail. Referring now to FIG. 5, when upgrading or otherwise modifying the engine service or module for the master server while a protection scenario is running, the upgrade program 505 transmits an upgrade or modify request to the master server 510 to notify the master server 510 of the available upgrade (step 520). The engine service installed on the master server 510 receives the upgrade request and transmits a notification of the engine upgrade to the replica server 515 (step 525). In response to the upgrade request, the engine service starts a mini filter driver (also referred to herein as an upgrade driver) (step 530). The upgrade driver freezes the file system in response to the upgrade request (step 535). In freezing the file system, file operations or other I/O requests (such as write, rename, etc.) that are received or otherwise intended for the protected file(s)/folder(s) are not written to the file system, that is, the upgrade driver blocks or suspends performance of such disk write operations until the upgrade or other modification of the engine is completed. In some embodiments, freezing the file system (at step 535) may only freeze the files and/or folders that are protected by the scenario being run, such that the computing service provided by the master server may be continuously provided without interruption during the upgrade.

Still referring to FIG. 5, the upgrade driver transmits a notification to the main/kernel driver to flush the journal files, and the current status of the engine and/or the current status data that is designated or specified by the scenario is kept or saved (step 540). The upgrade driver transmits a notification to the upgrade program 505 indicating that the status has been saved (step 545). In response, the upgrade program 505 performs the upgrade (step 550), and when complete, transmits a message to the master server 510 to start the engine service (step 555). Upon receiving this message, the engine service restores the previous status of the engine and the protected data prior to the upgrade, and the main/kernel driver captures changes (i.e., tracks or saves I/O requests) regarding the protected files that were received during performance of the upgrade (step 560). In some embodiments, the upgrade driver itself can also be upgraded or otherwise modified after the engine service is started (at step 555). The engine service stops the upgrade driver and unfreezes (i.e., resumes writing to) the file system (step 565), transmits a notification to the replica server 515 indicating that the upgrade has been completed (step 575), and enters the online replication phase (step 570). As the freezing of the file system (at step 535) prevented changes to the protected data during the upgrade of the engine, the replication may be resumed (at step 570) without first synchronizing the protected data with the replica server 515.

Figure 6:
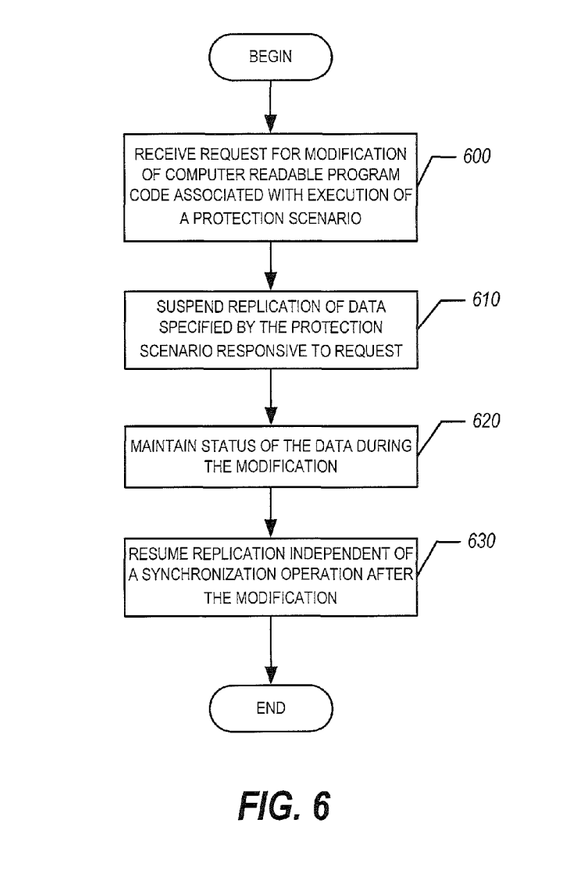

FIG. 6 illustrates operations that may be performed by a standby server (such as one or more of the servers 115B of FIG. 1) to maintain synchronization of data specified by a protection scenario during an upgrade, update, or other modification of the protection software installed on the standby server. Referring now to FIG. 6, operations begin at block 600 where a request for modification (for example, a request for an update and/or upgrade) of computer readable program code associated with the protection scenario is received. In response to the request, replication of the data specified by the protection scenario is suspended at block 610. For example, a notification may be sent from the standby/replica server to the production/master server (which includes or is otherwise associated with the storage medium including the data to be protected) requesting suspension of the replication process, and the master server may suspend replication in response to the notification. At block 620, the status of the data specified by the protection scenario and/or the status of the engine module to be upgraded is maintained during the modification. In particular, the respective status of the engine and/or the protected data may be saved in response to the suspension of replication, a notification may be transmitted to an upgrade program indicating that the status has been saved, and, after completion of the upgrade, the respective status of the engine and/or the protected data may be restored. As such, synchronization of the data specified by the scenario is maintained between the standby/replica server and the production/master server during the modification/upgrade/update. Accordingly, replication is resumed at block 630 without the need for (i.e., independent of) a synchronization operation after the modification is completed.

Figure 7:
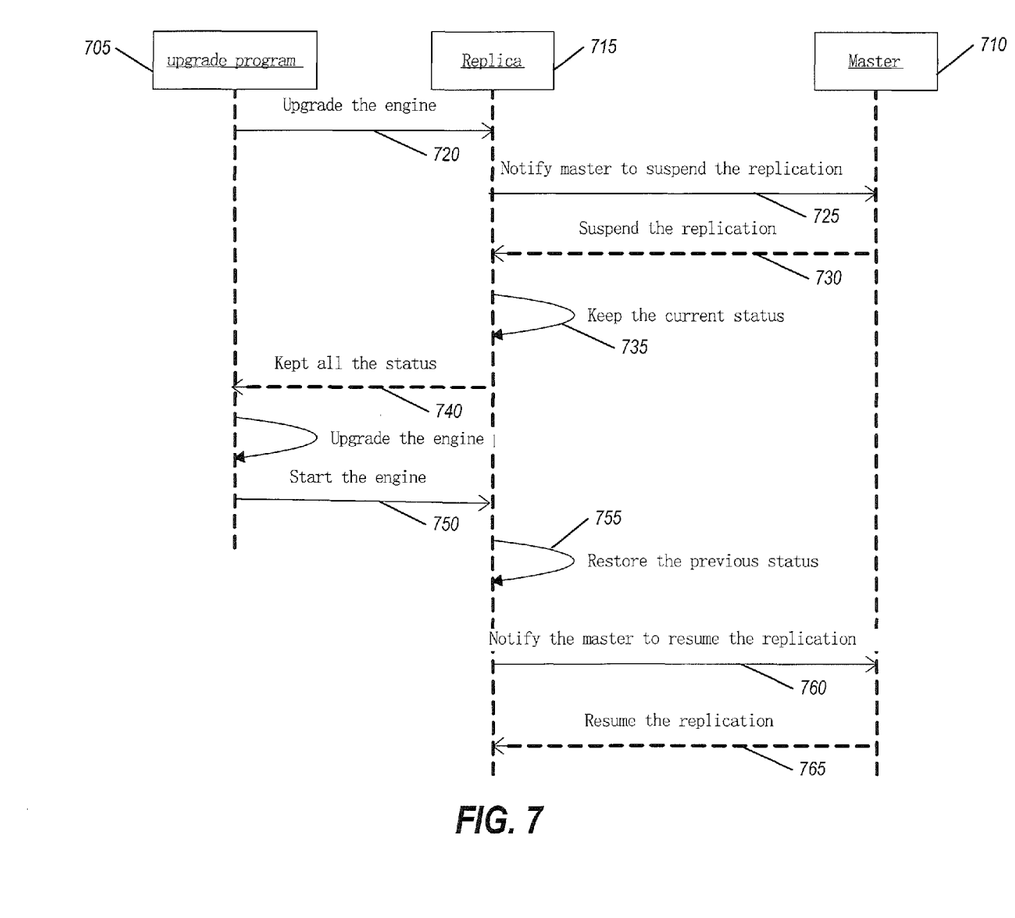

FIG. 7 is a flow diagram illustrating operations for upgrading an engine at the replica server according to some embodiments of the present disclosure in greater detail. Referring now to FIG. 7, when upgrading the replica engine service or module while a protection scenario is running, the upgrade program 705 transmits an upgrade request to the replica server 715 in order to notify the replica server 715 of the available upgrade (step 720). The engine 715 receives the upgrade request, and transmits a notification to the master server 710 to suspend the replication (step 725). After receiving a request to suspend the replication from the master server 710 (step 730), the replica server 715 keeps or saves the current status of the engine and/or the current status of the data that is designated or specified by the protection scenario (including journal files) (step 735), and transmits a notification to the upgrade program 705 indicating that the status has been kept and to proceed with the upgrade (step 740). In response, the upgrade program 705 performs the upgrade of the replica engine service (step 745), and when complete, transmits a message to the replica server 715 to start the engine service (step 750). After the engine has been upgraded and started, the replica server 715 restores or resumes the previous status of the engine and the protected data (such that the journal files are not lost) (step 755), and transmits a notification to the master server 710 indicating that it is ready to resume the replication (step 760). In response, the master server 410 transmits a request to the replica server 710 to resume the replication (step 765).

Embodiments of the present disclosure may be used with file-based replication, where the driver module is a file system driver that may capture changes with respect to a master file system stored on the production server, and where the engine module transfers the changes to a replica file system stored on the standby server. Embodiments described herein can also be applied to other replication schemes, for example, for database applications like SQL, Exchange, Oracle, etc. Embodiments of the present disclosure may provide several advantages, including (but not limited to) saving bandwidth and time relating to resynchronization operations after modification, and improving user satisfaction by reducing disruption of the application(s)/computing service(s) provided by the production server, with little to no impact on the production server and/or the application(s)/computing service(s) provided thereby.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of any means or step plus function elements in the claims below are intended to include any disclosed structure, material, or act for performing the function in combination with other claimed elements as specifically claimed.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method, comprising:
    receiving, by a processor, a request for modification of computer readable program code that provides a protection service for a production server, wherein the protection service protects data specified by a scenario via replication, and wherein the production server is configured to provide a client computing service that is distinct from the protection service for the production server;
    suspending, by the processor, writing to a storage medium associated with the production server with respect to the data specified by the scenario in response to the receiving the request; and
    performing, by the processor, a modification of the computer readable program code that provides the protection service for the production server, wherein synchronization of the data specified by the scenario is maintained between the storage medium associated with the production server and a different storage medium that is associated with a standby server during the modification of the computer readable program code that provides the protection service for the production server.

2. The method of claim 1, further comprising:
    transmitting a notification to proceed with the modification of the computer readable program code that provides the protection service for the production server in response to receiving the request;
    receiving an indication of completion of the modification responsive to transmitting the notification;
    capturing changes for the data specified by the scenario without writing the changes to the storage medium associated with the production server during the modification of the computer readable program code that provides the protection service for the production server; and
    transferring the changes to the different storage medium that is associated with the standby server responsive to receiving the indication and independent of a synchronization operation for the data specified by the scenario after completion of the modification of the computer readable program code that provides the protection service for the production server.

3. The method of claim 2, wherein capturing the changes without writing the changes to the storage medium during the modification comprises:
    tracking input/output (I/O) requests for the data specified by the scenario received during the modification of the computer readable program code that provides the protection service for the production server; and
    executing the I/O requests responsive to receiving the indication of completion of the modification of the computer readable program code that provides the protection service for the production server.

4. The method of claim 3, wherein suspending the writing comprises:
    providing an instruction to halt write operations to a storage area of the storage medium associated with the production server that includes the data specified by the scenario responsive to the request for modification; and
    providing an instruction to resume the write operations to the storage area responsive to the indication of completion,
    wherein the I/O requests are received between providing the instruction to halt and providing the instruction to resume the write operations.

5. The method of claim 4, wherein a duration of time between providing the instruction to halt and providing the instruction to resume the write operations is about one to two seconds.

6. The method of claim 4, wherein the computer readable program code comprises an engine module, and wherein the modification comprises an update and/or upgrade to the engine module, the method further comprising:
    saving a status of the data specified by the scenario or the engine module responsive to providing the instruction to halt the write operations to the storage area;
    transmitting the notification to proceed with the modification responsive to saving the status; and
    restoring the status of the data specified by the scenario or the engine module responsive to receiving the indication of completion of the modification.

7. The method of claim 6, further comprising the following prior to restoring the status:
    starting the engine module responsive to receiving the indication of completion of the modification; and
    transmitting a notification to proceed with modification of a driver module associated with the scenario responsive to starting the engine module.

8. The method of claim 4, wherein the data specified by the scenario corresponds to a file system of the production server, and wherein the I/O requests comprise file input/output events intended for the file system.

9. The method of claim 1, wherein the modification of the computer readable program code that provides the protection service for the production server is performed without interruption of the client computing service, and wherein a synchronization operation for the data specified by the scenario is not performed between the storage medium associated with the production server and the different storage medium associated with the standby server responsive to the modification of the computer readable program code that provides the protection service for the production server.

10. The method of claim 9, further comprising:
    permitting writing to the storage medium associated with the production server with respect to data that is not specified by the scenario during the modification.

11. A computer program product, comprising:
    a non-transitory computer readable storage medium having computer readable program code embodied in the medium, the computer readable program code comprising:
    computer readable program code to recognize a request for modification of computer readable program code that provides a protection service for a production server, wherein the protection service protects data specified by a scenario via replication from a storage medium associated with the production server to a different storage medium associated with a standby server, and wherein the production server is configured to provide a client computing service that is distinct from the protection service for the production server; and computer readable program code to suspend writing to the storage medium associated with the production server with respect to the data specified by the scenario in response to recognizing the request; and computer readable program code to perform a modification of the computer readable program code that provides the protection service for the production server such that synchronization of the data specified by the scenario is maintained between the production server and the standby server during the modification of the computer readable program code that provides the protection service for the production server.

12. The computer program product of claim 11, further comprising:

computer readable program code to transmit a notification to proceed with the modification of the computer readable program code that provides the protection service for the production server, responsive to receipt of the request;

computer readable program code to receive an indication of completion of the modification responsive to transmission of the notification;

computer readable program code to capture changes for the data specified by the scenario without writing the changes to the storage medium associated with the production server during the modification of the computer readable program code that provides the protection service for the production server; and computer readable program code to transfer the changes to the standby server responsive to the indication and independent of a synchronization operation for the data specified by the scenario after the completion of the modification of the computer readable program code that provides the protection service for the production server.

13. The computer program product of claim 12, wherein the computer readable program code to capture the changes without writing the changes to the storage medium associated with the production server during the modification comprises:

computer readable program code to track input/output (I/O) requests for the data specified by the scenario received during the modification of the computer readable program code that provides the protection service for the production server; and computer readable program code to execute the I/O requests responsive to receiving the indication of completion of the modification of the computer readable program code that provides the protection service for the production server.

14. The computer program product of claim 13, wherein the computer readable program code to suspend the writing comprises:

computer readable program code to provide an instruction to halt write operations to a storage area of the storage medium associated with the production server that includes the data specified by the scenario responsive to the request for modification; and computer readable program code to provide an instruction to resume the write operations to the storage area responsive to the indication of completion, wherein the I/O requests are received between providing the instruction to halt and providing the instruction to resume the write operations.

15. The computer program product of claim 14, wherein the computer readable program code that provides the protection service for the production server comprises an engine module, and wherein the modification comprises an update and/or upgrade to the engine module, the computer program product further comprising:

computer readable program code to save a status of the data specified by the scenario or the engine module responsive to providing the instruction to halt the write operations to the storage area;

computer readable program code to transmit a notification to proceed with the modification responsive to saving the status; and computer readable program code to restore the status of the data specified by the scenario or the engine module responsive to receiving the indication of completion of the modification.

16. The computer program product of claim 15, further comprising:

computer readable program code to start the engine module responsive to receiving the indication of completion of the modification; and computer readable program code to transmit the notification to proceed with modification of a driver module associated with the scenario responsive to starting the engine module and prior to restoration of the status.

17. The computer program product of claim 14, wherein the data specified by the scenario corresponds to a file system of the production server, and wherein the I/O requests comprise file input/output events intended for the file system.

18. The computer program product of claim 11, further comprising:

computer readable program code to permit writing to the storage medium associated with the production server with respect to data that is not specified by the scenario during the modification such that the modification of the computer readable program code that provides the protection service for the production server is performed without interruption of the client computing service, wherein a synchronization operation for the data specified by the scenario is not performed between the production server and the standby server responsive to the modification of the computer readable program code that provides the protection service for the production server.

19. A computer system, comprising:

a processor; and a memory coupled to the processor, the memory comprising computer readable program code embodied therein that, when executed by the processor, causes the processor to:

receive a request for modification of computer readable program code that provides a protection service for a production server, wherein the protection service protects data specified by a scenario via replication of the data specified by the scenario from a storage medium associated with the production server to a different storage medium that is associated with a standby server, and wherein the production server is configured to provide a client computing service that is distinct from the protection service for the production server;

suspend writing to the storage medium associated with the production server with respect to the data specified by the scenario in response to the request; and perform a modification of the computer readable program code that provides the protection service for the production server such that synchronization of the data specified by the scenario is maintained between the production server and a standby server during the modification of the computer readable program code that provides the protection service for the production server.

20. The computer system of claim 19, wherein the memory further comprises computer readable program code that, when executed by the processor, causes the processor to:

transmit a notification to proceed with the modification of the computer readable program code that provides the protection service for the production server, in response to receipt of the request;

receive an indication of completion of the modification responsive to transmission of the notification;

capture changes for the data specified by the scenario without writing the changes to the storage medium associated with the production server during the modification of the computer readable program code that provides the protection service for the production server; and transfer the changes to the different storage medium that is associated with the standby server responsive to receiving the indication and independent of a synchronization operation for the data specified by the scenario after the completion of the modification of the computer readable program code that provides the protection service for the production server.

21. The computer system of claim 20, wherein the computer readable program code, when executed by the processor to capture the changes without writing the changes to the storage medium associated with the production server during the modification, causes the processor to:

track input/output (I/O) requests for the data specified by the scenario received during the modification of the computer readable program code that provides the protection service for the production server; and execute the I/O requests responsive to receiving the indication of completion of the modification of the computer readable program code that provides the protection service for the production server.

22. The computer system of claim 21, wherein the computer readable program code, when executed by the processor to suspend the writing, causes the processor to:

provide an instruction to halt write operations to a storage area of the storage medium associated with the production server that includes the data specified by the scenario responsive to the request for modification; and provide an instruction to resume the write operations to the storage area responsive to the indication of completion, wherein the I/O requests are received between the instruction to halt and the instruction to resume the write operations.

23. The computer system of claim 22, wherein the computer readable program code that provides the protection service comprises an engine module, wherein the modification comprises an update and/or upgrade to the engine module, and wherein the memory further comprises computer readable program code that, when executed by the processor, causes the processor to:

save a status of the data specified by the scenario or the engine module responsive to providing the instruction to halt the write operations to the storage area;

transmit the notification to proceed with the modification responsive to saving the status; and restore the status of the data specified by the scenario or the engine module responsive to receiving the indication of completion of the modification.

24. The computer system of claim 23, wherein the memory further comprises computer readable program code that, when executed by the processor, causes the processor to:

start the engine module responsive to receiving the indication of completion of the modification; and transmit a notification to proceed with modification of a driver module associated with the scenario responsive to starting the engine module and prior to restoration of the status.

25. The computer system of claim 22, wherein the data specified by the scenario corresponds to a file system of the production server, and wherein the I/O requests comprise file input/output events intended for the file system.

26. The computer system of claim 19, wherein the memory further comprises computer readable program code that, when executed by the processor, causes the processor to:

permit writing to the storage medium associated with the production server with respect to data that is not specified by the scenario during the modification such that the modification of the computer readable program code that provides the protection service for the production server is performed without interruption of the client computing service, wherein a synchronization operation for the data specified by the scenario is not performed between the production server and the standby server responsive to the modification of the computer readable program code that provides the protection service for the production server.

* * * * *